(12) United States Patent
Whitesides et al.

(10) Patent No.: US 7,304,787 B2
(45) Date of Patent: Dec. 4, 2007

(54) ELECTRO-OPTIC DISPLAYS

(75) Inventors: Thomas H. Whitesides, Somerville, MA (US); Michael D. McCreary, Acton, MA (US); Richard J. Paolini, Jr., Framingham, MA (US); Charles H. Honeyman, Roslindale, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 11/460,358

(22) Filed: Jul. 27, 2006

(65) Prior Publication Data

US 2006/0256425 A1 Nov. 16, 2006

Related U.S. Application Data

(62) Division of application No. 11/161,179, filed on Jul. 26, 2005, now Pat. No. 7,116,466.

(60) Provisional application No. 60/591,416, filed on Jul. 27, 2004.

(51) Int. Cl.
G02B 26/00 (2006.01)
(52) U.S. Cl. ............................ 359/296; 345/107
(58) Field of Classification Search ................ 359/296, 359/245, 263, 252, 253, 267, 295; 345/107, 345/84
See application file for complete search history.

(56) References Cited

U.S. PATENT DOCUMENTS

| | | |
|---|---|---|
| 3,668,106 A | 6/1972 | Ota |
| 3,683,382 A | 8/1972 | Ballinger |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,273,422 A | 6/1981 | Saxe |
| 4,390,403 A | 6/1983 | Batchelder |

(Continued)

FOREIGN PATENT DOCUMENTS

EP 0 709 713 A2 5/1996

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner*—Timothy Thompson
(74) *Attorney, Agent, or Firm*—David J. Cole

(57) ABSTRACT

An electrophoretic display comprises an electrophoretic medium having a plurality of charged particles suspended in a suspending fluid, and two electrodes disposed on opposed sides of the electrophoretic medium. At least one of the electrodes is light-transmissive and forming a viewing surface. The display has a closed optical state in which the charged particles are spread over substantially the entire viewing surface so that light cannot pass through the medium, and an open optical state in which the electrophoretic particles form chains extending between the electrodes so that light can pass through the electrophoretic medium. Insulating layers are disposed between the electrodes and the electrophoretic medium. Similarly electrophoretic displays are provided equipped with color filter arrays or reflectors.

24 Claims, 2 Drawing Sheets

U.S. PATENT DOCUMENTS

| | | | |
|---|---|---|---|
| 4,418,346 A | 11/1983 | Batchelder | |
| 5,745,094 A | 4/1998 | Gordon, II et al. | |
| 5,760,761 A | 6/1998 | Sheridon | |
| 5,777,782 A | 7/1998 | Sheridon | |
| 5,808,783 A | 9/1998 | Crowley | |
| 5,872,552 A | 2/1999 | Gordon, II et al. | |
| 5,930,026 A | 7/1999 | Jacobson et al. | |
| 5,961,804 A | 10/1999 | Jacobson et al. | |
| 6,017,584 A | 1/2000 | Albert et al. | |
| 6,054,071 A | 4/2000 | Mikkelsen, Jr. | |
| 6,055,091 A | 4/2000 | Sheridon et al. | |
| 6,067,185 A | 5/2000 | Albert et al. | |
| 6,097,531 A | 8/2000 | Sheridon | |
| 6,118,426 A | 9/2000 | Albert et al. | |
| 6,120,588 A | 9/2000 | Jacobson | |
| 6,120,839 A | 9/2000 | Comiskey et al. | |
| 6,124,851 A | 9/2000 | Jacobson | |
| 6,128,124 A | 10/2000 | Silverman | |
| 6,130,773 A | 10/2000 | Jacobson et al. | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon | |
| 6,172,798 B1 | 1/2001 | Albert et al. | |
| 6,177,921 B1 | 1/2001 | Comiskey et al. | |
| 6,184,856 B1 | 2/2001 | Gordon, II et al. | |
| 6,225,971 B1 | 5/2001 | Gordon, II et al. | |
| 6,232,950 B1 | 5/2001 | Albert et al. | |
| 6,241,921 B1 | 6/2001 | Jacobson et al. | |
| 6,249,271 B1 | 6/2001 | Albert et al. | |
| 6,252,564 B1 | 6/2001 | Albert et al. | |
| 6,262,706 B1 | 7/2001 | Albert et al. | |
| 6,262,833 B1 | 7/2001 | Loxley et al. | |
| 6,271,823 B1 | 8/2001 | Gordon, II et al. | |
| 6,300,932 B1 | 10/2001 | Albert | |
| 6,301,038 B1 | 10/2001 | Fitzmaurice et al. | |
| 6,312,304 B1 | 11/2001 | Duthaler et al. | |
| 6,312,971 B1 | 11/2001 | Amundson et al. | |
| 6,323,989 B1 | 11/2001 | Jacobson et al. | |
| 6,327,072 B1 | 12/2001 | Comiskey et al. | |
| 6,330,054 B1 | 12/2001 | Ikami | |
| 6,376,828 B1 | 4/2002 | Comiskey | |
| 6,377,387 B1 | 4/2002 | Duthaler et al. | |
| 6,392,785 B1 | 5/2002 | Albert et al. | |
| 6,392,786 B1 | 5/2002 | Albert | |
| 6,407,763 B1 | 6/2002 | Yamaguchi et al. | |
| 6,413,790 B1 | 7/2002 | Duthaler et al. | |
| 6,422,687 B1 | 7/2002 | Jacobson | |
| 6,445,374 B2 | 9/2002 | Albert et al. | |
| 6,445,489 B1 | 9/2002 | Jacobson et al. | |
| 6,459,418 B1 | 10/2002 | Comiskey et al. | |
| 6,473,072 B1 | 10/2002 | Comiskey et al. | |
| 6,480,182 B2 | 11/2002 | Turner et al. | |
| 6,498,114 B1 | 12/2002 | Amundson et al. | |
| 6,504,524 B1 | 1/2003 | Gates et al. | |
| 6,506,438 B2 | 1/2003 | Duthaler et al. | |
| 6,512,354 B2 | 1/2003 | Jacobson et al. | |
| 6,515,649 B1 | 2/2003 | Albert et al. | |
| 6,518,949 B2 | 2/2003 | Drzaic | |
| 6,521,489 B2 | 2/2003 | Duthaler et al. | |
| 6,531,997 B1 | 3/2003 | Gates et al. | |
| 6,535,197 B1 | 3/2003 | Comiskey et al. | |
| 6,538,801 B2 | 3/2003 | Jacobson et al. | |
| 6,545,291 B1 | 4/2003 | Amundson et al. | |
| 6,580,545 B2 | 6/2003 | Morrison et al. | |
| 6,639,578 B1 | 10/2003 | Comiskey et al. | |
| 6,652,075 B2 | 11/2003 | Jacobson | |
| 6,657,612 B2 | 12/2003 | Machida et al. | |
| 6,657,772 B2 | 12/2003 | Loxley | |
| 6,664,944 B1 | 12/2003 | Albert et al. | |
| D485,294 S | 1/2004 | Albert | |
| 6,672,921 B1 | 1/2004 | Liang et al. | |
| 6,680,725 B1 | 1/2004 | Jacobson | |
| 6,683,333 B2 | 1/2004 | Kazlas et al. | |
| 6,693,620 B1 | 2/2004 | Herb et al. | |
| 6,704,133 B2 | 3/2004 | Gates et al. | |
| 6,710,540 B1 | 3/2004 | Albert et al. | |
| 6,721,083 B2 | 4/2004 | Jacobson et al. | |
| 6,724,519 B1 | 4/2004 | Comiskey et al. | |
| 6,727,881 B1 | 4/2004 | Albert et al. | |
| 6,738,050 B2 | 5/2004 | Comiskey et al. | |
| 6,741,386 B2 | 5/2004 | Minami | |
| 6,750,473 B2 | 6/2004 | Amundson et al. | |
| 6,753,999 B2 | 6/2004 | Zehner et al. | |
| 6,788,449 B2 | 9/2004 | Liang et al. | |
| 6,816,147 B2 | 11/2004 | Albert | |
| 6,819,471 B2 | 11/2004 | Amundson et al. | |
| 6,822,782 B2 | 11/2004 | Honeyman et al. | |
| 6,825,068 B2 | 11/2004 | Denis et al. | |
| 6,825,829 B1 | 11/2004 | Albert et al. | |
| 6,825,970 B2 | 11/2004 | Goenaga et al. | |
| 6,831,769 B2 | 12/2004 | Holman et al. | |
| 6,839,158 B2 | 1/2005 | Albert et al. | |
| 6,842,167 B2 | 1/2005 | Albert et al. | |
| 6,842,279 B2 | 1/2005 | Amundson | |
| 6,842,657 B1 | 1/2005 | Drzaic et al. | |
| 6,864,875 B2 | 3/2005 | Drzaic et al. | |
| 6,865,010 B2 | 3/2005 | Duthaler et al. | |
| 6,866,760 B2 | 3/2005 | Paolini Jr. et al. | |
| 6,870,657 B1 | 3/2005 | Fitzmaurice et al. | |
| 6,870,661 B2 | 3/2005 | Pullen et al. | |
| 6,900,851 B2 | 5/2005 | Morrison et al. | |
| 6,922,276 B2 | 7/2005 | Zhang et al. | |
| 6,950,220 B2 | 9/2005 | Abramson et al. | |
| 6,958,848 B2 | 10/2005 | Cao et al. | |
| 6,967,640 B2 | 11/2005 | Albert et al. | |
| 6,980,196 B1 | 12/2005 | Turner et al. | |
| 6,982,178 B2 | 1/2006 | LeCain et al. | |
| 6,987,603 B2 | 1/2006 | Paolini, Jr. et al. | |
| 6,995,550 B2 | 2/2006 | Jacobson et al. | |
| 7,002,728 B2 | 2/2006 | Pullen et al. | |
| 7,012,600 B2 | 3/2006 | Zehner et al. | |
| 7,012,735 B2 | 3/2006 | Honeyman et al. | |
| 7,046,228 B2 * | 5/2006 | Liang et al. | 345/107 |
| 2002/0060321 A1 | 5/2002 | Kazlas et al. | |
| 2002/0063661 A1 | 5/2002 | Comiskey et al. | |
| 2002/0090980 A1 | 7/2002 | Wilcox et al. | |
| 2002/0113770 A1 | 8/2002 | Jacobson et al. | |
| 2002/0130832 A1 | 9/2002 | Baucom et al. | |
| 2002/0180687 A1 | 12/2002 | Webber | |
| 2002/0196207 A1 | 12/2002 | Machida et al. | |
| 2003/0011560 A1 | 1/2003 | Albert et al. | |
| 2003/0035198 A1 | 2/2003 | Liang et al. | |
| 2003/0099027 A1 | 5/2003 | Shigehiro et al. | |
| 2003/0102858 A1 | 6/2003 | Jacobson et al. | |
| 2003/0132908 A1 | 7/2003 | Herb et al. | |
| 2003/0151702 A1 | 8/2003 | Morrison et al. | |
| 2003/0222315 A1 | 12/2003 | Amundson et al. | |
| 2004/0014265 A1 | 1/2004 | Kazlas et al. | |
| 2004/0075634 A1 | 4/2004 | Gates | |
| 2004/0094422 A1 | 5/2004 | Pullen et al. | |
| 2004/0105036 A1 | 6/2004 | Danner et al. | |
| 2004/0112750 A1 | 6/2004 | Jacobson et al. | |
| 2004/0119681 A1 | 6/2004 | Albert et al. | |
| 2004/0136048 A1 | 7/2004 | Arango et al. | |
| 2004/0155857 A1 | 8/2004 | Duthaler et al. | |
| 2004/0180476 A1 | 9/2004 | Kazlas et al. | |
| 2004/0190114 A1 | 9/2004 | Jacobson et al. | |
| 2004/0196215 A1 | 10/2004 | Duthaler et al. | |
| 2004/0226820 A1 | 11/2004 | Webber et al. | |
| 2004/0239614 A1 | 12/2004 | Amundson et al. | |
| 2004/0252360 A1 | 12/2004 | Webber et al. | |
| 2004/0257635 A1 | 12/2004 | Paolini, Jr. et al. | |
| 2004/0263947 A1 * | 12/2004 | Drzaic et al. | 359/296 |

| | | | |
|---|---|---|---|
| 2005/0000813 A1 | 1/2005 | Pullen et al. | |
| 2005/0001810 A1 | 1/2005 | Yakushiji et al. | |
| 2005/0001812 A1 | 1/2005 | Amundson et al. | |
| 2005/0007336 A1 | 1/2005 | Albert et al. | |
| 2005/0012980 A1 | 1/2005 | Wilcox et al. | |
| 2005/0017944 A1 | 1/2005 | Albert | |
| 2005/0018273 A1 | 1/2005 | Honeyman et al. | |
| 2005/0024353 A1 | 2/2005 | Amundson et al. | |
| 2005/0035941 A1 | 2/2005 | Albert et al. | |
| 2005/0041004 A1 | 2/2005 | Gates et al. | |
| 2005/0062714 A1 | 3/2005 | Zehner et al. | |
| 2005/0067656 A1 | 3/2005 | Denis et al. | |
| 2005/0078099 A1 | 4/2005 | Amundson et al. | |
| 2005/0105159 A1 | 5/2005 | Paolini, Jr. et al. | |
| 2005/0105162 A1 | 5/2005 | Paolini, Jr. et al. | |
| 2005/0122284 A1 | 6/2005 | Gates et al. | |
| 2005/0122306 A1 | 6/2005 | Wilcox et al. | |
| 2005/0122563 A1 | 6/2005 | Honeyman et al. | |
| 2005/0122564 A1 | 6/2005 | Zehner et al. | |
| 2005/0122565 A1 | 6/2005 | Doshi et al. | |
| 2005/0134554 A1 | 6/2005 | Albert et al. | |
| 2005/0146774 A1 | 7/2005 | LeCain et al. | |
| 2005/0151709 A1 | 7/2005 | Jacobson et al. | |
| 2005/0152018 A1 | 7/2005 | Abramson et al. | |
| 2005/0152022 A1 | 7/2005 | Honeyman et al. | |
| 2005/0156340 A1 | 7/2005 | Valianatos et al. | |
| 2005/0168799 A1 | 8/2005 | Whitesides et al. | |
| 2005/0168801 A1 | 8/2005 | O'Neil et al. | |
| 2005/0179642 A1 | 8/2005 | Wilcox et al. | |
| 2005/0190137 A1 | 9/2005 | Duthaler et al. | |
| 2005/0212747 A1 | 9/2005 | Amundson | |
| 2005/0213191 A1 | 9/2005 | Whitesides et al. | |
| 2005/0253777 A1 | 11/2005 | Zehner et al. | |
| 2006/0007527 A1 | 1/2006 | Paolini, Jr. et al. | |
| 2006/0152472 A1* | 7/2006 | Nishiyama et al. | 345/107 |

FOREIGN PATENT DOCUMENTS

| | | |
|---|---|---|
| EP | 1 254 930 A2 | 11/2002 |
| EP | 1 145 072 B1 | 5/2003 |
| EP | 1 462 847 | 9/2004 |
| EP | 1 482 354 | 12/2004 |
| EP | 1 484 635 | 12/2004 |
| EP | 1 500 971 A1 | 1/2005 |
| EP | 1 501 194 A1 | 1/2005 |
| EP | 1 536 271 | 6/2005 |
| EP | 1 577 702 | 9/2005 |
| EP | 1 577 703 | 9/2005 |
| EP | 1 598 694 | 11/2005 |
| JP | 03-053224 A | 3/1991 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 03/107315 | 12/2003 |
| WO | WO 2004/001498 | 12/2003 |
| WO | WO 2004/008239 | 1/2004 |
| WO | WO 2004/079442 | 9/2004 |
| WO | WO 2004/090626 | 10/2004 |
| WO | WO 2005/034074 | 4/2005 |
| WO | WO 2005/052905 | 6/2005 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al., "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G. M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

Moesner, F.M., et al., "Devices for Particle Handling by an AC Electric Field", IEEE, 1995, p. 66.

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Vaz, N.A., et al., "Dual-frequency addressing of polymer-dispersed liquid-crystal films", J. Appl. Phys., 65, 5043 (1989).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

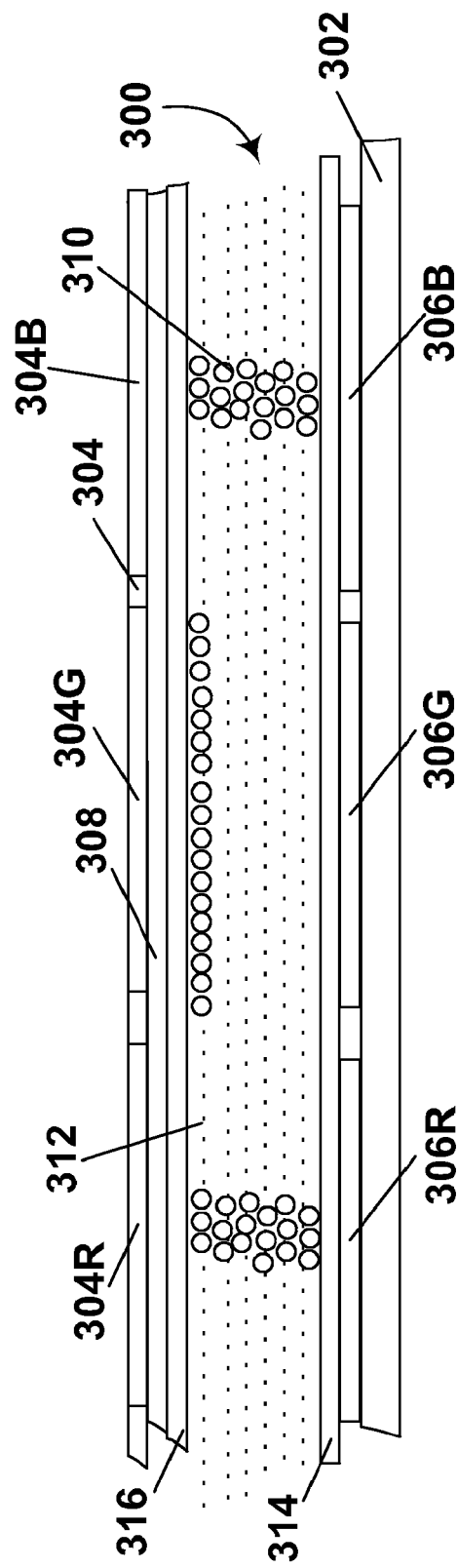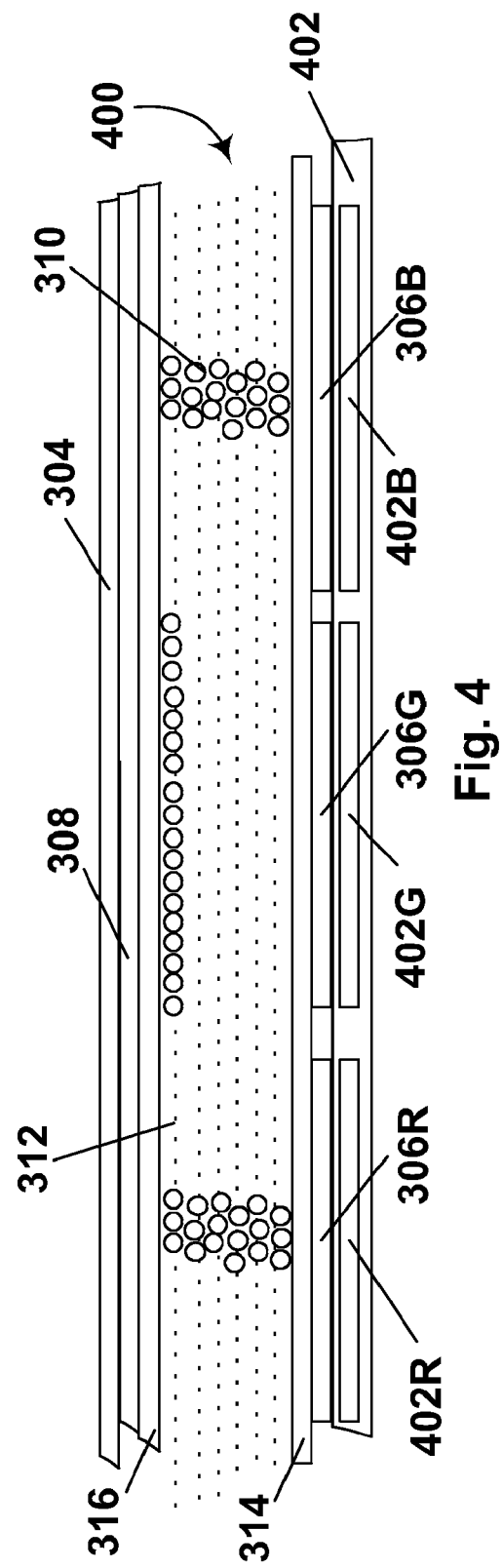

ELECTRO-OPTIC DISPLAYS

REFERENCE TO RELATED APPLICATIONS

This application is a divisional of copending application Ser. No. 11/161,179, filed Jul. 26, 2005 (Publication No. 2006/0023296, now U.S. Pat. No. 7,116,466), which claims benefit of copending provisional application Ser. No. 60/591,416, filed Jul. 27, 2004.

This application is related to copending application Ser. No. 10/907,140, filed Mar. 22, 2005 (Publication No. 2005/0213191), which itself claims benefit of provisional Application Ser. No. 60/555,529, filed Mar. 23, 2004, and of provisional Application Ser. No. 60/585,579, filed Jul. 7, 2004. This application is also related to copending application Ser. No. 10/687,166, filed Oct. 16, 2003 (Publication No. 2004/0136048).

The entire contents of the aforementioned applications, and of all other U.S. patents and published and copending applications mentioned below, are herein incorporated by reference.

BACKGROUND OF INVENTION

This invention relates to electro-optic displays. These displays may either be shutter mode displays (as the term is defined below) or light modulators, that is to say to variable transmission windows, mirrors and similar devices designed to modulate the amount of light or other electro-magnetic radiation passing therethrough; for convenience, the term "light" will normally be used herein, but this term should be understood in a broad sense to include electro-magnetic radiation at non-visible wavelengths. For example, as mentioned below, the present invention may be applied to provide windows which can modulate infra-red radiation for controlling temperatures within buildings. More specifically, this invention relates to electro-optic displays and light modulators which use particle-based electrophoretic media to control light modulation.

Particle-based electrophoretic displays, in which a plurality of charged particles move through a suspending fluid under the influence of an electric field, have been the subject of intense research and development for a number of years. Such displays can have attributes of good brightness and contrast, wide viewing angles, state bistability, and low power consumption when compared with liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Nevertheless, problems with the long-term image quality of these displays have prevented their widespread usage. For example, particles that make up electrophoretic displays tend to settle, resulting in inadequate service-life for these displays.

As noted above, electrophoretic media require the presence of a suspending fluid. In most prior art electrophoretic media, this suspending fluid is a liquid, but electrophoretic media can be produced using gaseous suspending fluids; see, for example, Kitamura, T., et al., "Electrical toner movement for electronic paper-like display", IDW Japan, 2001, Paper HCS1-1, and Yamaguchi, Y, et al., "Toner display using insulative particles charged triboelectrically", IDW Japan, 2001, Paper AMD4-4). See also European Patent Applications 1,429,178; 1,462,847; and 1,482,354; and International Applications WO 2004/090626; WO 2004/079442; WO 2004/077140; WO 2004/059379; WO 2004/055586; WO 2004/008239; WO 2004/006006; WO 2004/001498; WO 03/091799; and WO 03/088495. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; and 6,870,661; and U.S. Patent Applications Publication Nos. 2002/0060321; 2002/0063661; 2002/0090980; 2002/0113770; 2002/0130832; 2002/0180687; 2003/0011560; 2003/0020844; 2003/0025855; 2003/0102858; 2003/0132908; 2003/0137521; 2003/0151702; 2003/0214695; 2003/0222315; 2004/0012839; 2004/0014265; 2004/0027327; 2004/0075634; 2004/0094422; 2004/0105036; 2004/0112750; 2004/0119681; 2004/0136048; 2004/0155857; 2004/0180476; 2004/0190114; 2004/0196215; 2004/0226820; 2004/0233509; 2004/0239614; 2004/0252360; 2004/0257635; 2004/0263947; 2005/0000813; 2005/0001812; 2005/0007336; 2005/

0007653; 2005/0012980; 2005/0017944; 2005/0018273; 2005/0024353; 2005/0035941; 2005/0041004; 2005/0062714; 2005/0067656; and 2005/0078099; and International Applications Publication Nos. WO 99/67678; WO 00/05704; WO 00/38000; WO 00/36560; WO 00/67110; WO 00/67327; WO 01/07961; and WO 03/107,315.

Known electrophoretic media, both encapsulated and unencapsulated, can be divided into two main types, referred to hereinafter for convenience as "single particle" and "dual particle" respectively. A single particle medium has only a single type of electrophoretic particle suspended in a suspending medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode, so that the particles are hidden by the suspending medium).

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles is black and the other type white. If the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

It should be noted that opposite charge "dual particle" media may contain more than two types of particle. For example, the aforementioned U.S. Pat. No. 6,232,950 illustrates, in FIGS. 6-9C, an opposite charge encapsulated triple particle system having three differently colored types of particles in the same capsule; this patent also describes driving methods which enable the capsule to display the colors of the three types of particles. Even more types of particles may be present; it has been found empirically that up to five different types of particles can usefully be present in such displays.

If the two types of particles have charges of the same polarity, but differ in electrophoretic mobility (this type of medium may hereinafter to referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid be sufficiently transparent to allow the layer of white particles remote from the rear electrode to be readily visible to the observer. Typically, the suspending fluid in such a display is not colored at all, but some color may be incorporated for the purpose of correcting any undesirable tint in the white particles seen therethrough.

Both single and dual particle electrophoretic displays may be capable of intermediate gray states having optical characteristics intermediate the two extreme optical states already described.

Some of the aforementioned patents and published applications disclose encapsulated electrophoretic media having three or more different types of particles within each capsule. For purposes of the present application, such multi-particle media are regarded as sub-species of dual particle media.

Also, many of the aforementioned patents and applications recognize that the walls surrounding the discrete microcapsules in an encapsulated electrophoretic medium could be replaced by a continuous phase, thus producing a so-called "polymer-dispersed electrophoretic display", in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

Shutter mode displays can be used as conventional reflective displays, for example, by using particles having one color and providing a surface of a different color positioned on the opposed side of the electro-optic medium from the viewing surface through which an observer views the display; see, for example, the International U.S. Pat. No. 6,177,921. Alternatively, shutter mode displays can be used as light modulators, that is to say devices which in one (open or transparent) optical state allows light to pass therethrough, while in another (closed or opaque) optical state the light is blocked.

One potentially important market for electrophoretic media is windows with variable light transmission. As the energy performance of buildings and vehicles becomes increasingly important, light modulators could be used as coatings on windows to enable the proportion of incident radiation transmitted through the windows to be electronically controlled by varying the optical state of the modulator. Such electronic control can supersede "mechanical" control of incident radiation by, for example, the use of window blinds. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications of VT technology include privacy glass and glare-guards in electronic devices.

Hitherto, relatively little consideration appears to have been given to the exact manner in which the electrophoretic particles move when electrophoretic shutter mode displays, including light modulators, move between their open and closed optical states. As discussed in the aforementioned copending application Ser. No. 10/907,140, the open state is brought about by field dependent aggregation of the electrophoretic particles; such field dependent aggregation may take the form of dielectrophoretic movement of electrophoretic particles to the lateral walls of a capsule or microcell, or "chaining", i.e., formation of strands of electrophoretic particles within the capsule or microcell, or possibly in other ways. Regardless of the exact type of aggregation achieved, such field dependent aggregation of the electrophoretic particles causes the particles to occupy only a small proportion of the viewable area of each capsule or microcell, as seen looking perpendicular to the viewing surface through which an observer views the medium. Thus, in the transparent state, the major part of the viewable area of each capsule or microcell is free from electrophoretic particles and light can pass freely therethrough. In contrast, in the opaque state, the electrophoretic particles are distributed throughout the whole viewable area of each capsule or microcell (the particles may be uniformly distributed throughout the volume of the suspending fluid or concentrated in a layer adjacent one major surface of the electrophoretic layer), so that no light can pass therethrough.

European Patent Application No. 709,713 describes several different types of shutter mode electrophoretic displays which rely upon chaining of the electrophoretic particles. These shutter mode electrophoretic displays are of two principal types. In the first type, as shown for example in FIGS. 1-6 of this Application, chaining occurs between two unpatterned electrodes on either side of an electrophoretic medium, which comprises electrophoretic particles in an insulating fluid, typically a silicone oil. The electrophoretic particles themselves comprise a polymeric core with an outer inorganic layer formed from an electrically semiconductive material, an inorganic ion exchanger, silica gel or one of these materials doped with a metal. Such electrophoretic particles are likely to be difficult and expensive to manufacture, but are apparently required because the chaining of the particles requires polarizable particles; conductive particles cannot be used since they would short the electrodes when chaining occurs. The operating voltage appears to rather high; the recommended field across the electrophoretic medium is 0.25 kV/mm to 1.5 kV/mm, or 25 to 150 volts for a 100 μm thick electrophoretic layer. The closing of the display (i.e., the transition from its light transmissive to its opaque state) is effected by diffusion of the particles throughout the electrophoretic medium, and hence will be slow. Furthermore, such a display is stable only in its closed state.

In the second type of shutter mode display described in European Patent Application No. 709,713 (see FIGS. 31 and 32B thereof), one electrode is unpatterned, but the opposing electrode is formed as a series of narrow parallel strips, divided into two alternating sets with provision for applying different voltages to the two sets. In the open optical state of such a display, all the strips are set to the same voltage, which is different from that of the unpatterned electrode, so that chains are formed between the unpatterned electrode and each of the strips. In the closed optical state of the display, differing voltages are applied to the two sets of strips, so that chaining occurs between adjacent strips; the voltage applied to the unpatterned electrode is essentially irrelevant, provided it is intermediate the voltages applied to the two sets of strips. This type of display uses the same complex electrophoretic particles as the first type of display described above. In addition, it appears doubtful that the closed state of such a display would be completely dark, since there will inevitably tend to be some gaps between adjacent chains in the closed state and even a small proportion of such gaps will adversely affect the darkness of the closed state. Although this second type of display will close more quickly than the first type described above, since it can be actively driven to its closed state rather than relying upon diffusion, it is not truly bistable in either optical state.

Finally, especially in high resolution displays, the formation of the necessary narrow strip electrodes presents manufacturing problems.

The present invention relates to shutter mode electrophoretic displays, including light modulators, which do not suffer from the disadvantages of the prior art displays discussed above.

SUMMARY OF INVENTION

In one aspect, this invention provides an electrophoretic display comprising:

an electrophoretic medium having a plurality of charged particles suspended in a suspending fluid, and two electrodes disposed on opposed sides of the electrophoretic medium, at least one of the electrodes being light-transmissive and forming a viewing surface through which an observer can view the display, the display having a closed optical state in which the charged particles are spread over substantially the entire viewing surface so that light cannot pass through the electrophoretic medium, and an open optical state in which the electrophoretic particles form chains extending between the electrodes so that light can pass through the electrophoretic medium, the display further comprising insulating layers disposed between the electrodes and the electrophoretic medium.

This display may for convenience hereinafter be called the "insulating layers" or "IL" display of the invention. For reasons explained below, this type of display is especially useful when at least some of the charged particles are electrically conductive. For example, the charged particles may comprise carbon black. The insulating layer may have a volume resistivity of about $10^9$ to about $10^{11}$ ohm cm. In some cases, the insulating layer remote from the viewing surface may be formed by an adhesive layer.

An IL electrophoretic display of the present invention may use any of the known types of electrophoretic medium. For example, the electrophoretic medium may be encapsulated, with the charged particles and the suspending fluid confined within a plurality of capsules; the capsules may be held within a polymeric binder. In such an encapsulated display, at least one of the insulating layers may be comprised of the binder and/or the walls of the capsules. Alternatively, the electrophoretic medium may be of the polymer-dispersed or microcell type, with the charged particles and the suspending fluid present as a plurality of discrete droplets held within a continuous phase comprising a polymeric binder. In the case of a microcell medium, the continuous phase forms walls separating a plurality of cells in which the charged particles and the suspending fluid are confined.

An IL electrophoretic display of the present invention may comprise voltage supply means for applying voltages to the two electrodes, the voltage supply means being arranged to supply both a high frequency alternating current voltage effective to drive the display to its open optical state and a low frequency alternating or direct current voltage effective to drive the display to its closed optical state. The high frequency alternating current voltage may have a frequency in the range of about 200 to about 1000 Hz, and the low frequency alternating or direct current voltage may have a frequency in the range of 0 to about 50 Hz. The voltage supply means may also be arranged to supply at least one intermediate frequency alternating current voltage having a frequency intermediate those of the high frequency alternating current voltage and the low frequency alternating or direct current voltage, the intermediate frequency alternating current voltage being effective to drive the display to a gray state intermediate the open and closed optical states of the display.

For reasons explained below, in the IL electrophoretic display of the present invention, the suspending fluid may have dissolved or dispersed therein a polymer having an intrinsic viscosity of η in the suspending fluid and being substantially free from ionic or ionizable groups in the suspending fluid, the polymer being present in the suspending fluid in a concentration of from about $0.5\eta^{-1}$ to about $2.0\eta^{-1}$. The polymer may be polyisobutylene.

In another aspect, this invention provides an electrophoretic display having a plurality of pixels and comprising:

an electrophoretic medium having a plurality of charged particles suspended in a suspending fluid, and electrodes disposed on opposed sides of the electrophoretic medium, at least one of the electrodes being light-transmissive and forming a viewing surface through which an observer can view the display, each pixel of the display having a closed optical state in which the charged particles are spread over substantially the entire viewing surface of the pixel so that light cannot pass through the electrophoretic medium, and an open optical state in which the electrophoretic particles form chains extending between the electrodes of the pixel so that light can pass through the pixel, the display further comprising a color array adjacent the display so as to be visible to the observer, such that the color of the display perceived by the observer can be varied by changing the open and closed optical states of the various pixels of the display.

There are several different variations of such a "color array" display. The color array may be either a color filter array (i.e., an array of colored but light-transmissive elements) or a color reflector array (i.e., an array of colored reflective elements). A color filter array may be disposed either adjacent the viewing surface of the display or on the opposed side of the display. In either case, the display may be backlit (i.e., a light source may be provided on the opposed side of the display from the viewing surface so that that an observer can view light passing from the source through the display, or a separate reflector may be provided on the opposed side of the display from the observer. A color reflector array should, of course, be disposed on the opposed side of the array from the viewing surface.

BRIEF DESCRIPTION OF DRAWINGS

FIG. 3 is a schematic cross-section, similar to that of FIG. 1, through a color filter array display of the present invention.

FIG. 4 is a schematic cross-section, similar to those of FIGS. 1 and 3, through a color reflector display of the present invention.

DETAILED DESCRIPTION

Figure 1:
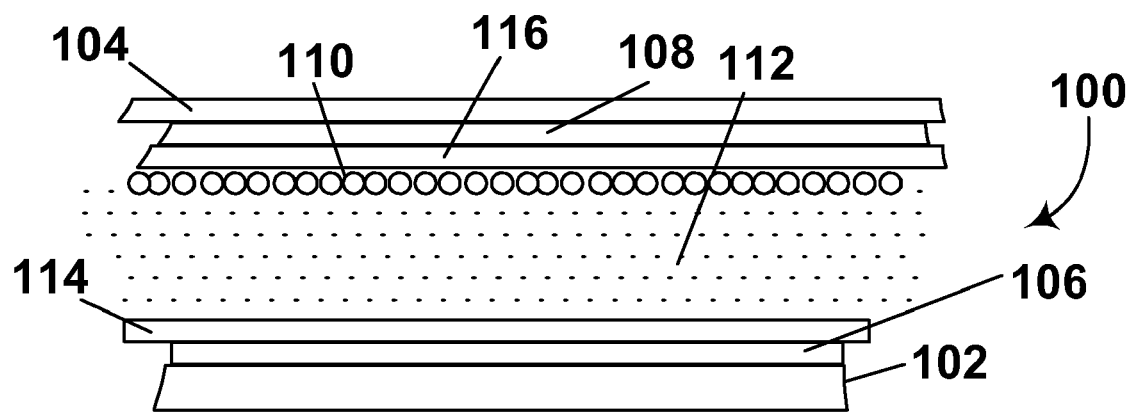
FIG. 1 of the accompanying drawing is a schematic cross-section through an insulating layers display of the present invention showing the display in its closed optical state.

As indicated above, this invention has two main aspects, which are primarily described separately below. However, it should be understood that a single display may make use of more than one aspect of the present invention; for example, a color array display of the present invention may also contain insulating layers in accordance with the insulating layers aspect of the invention.

As already mentioned, in its first aspect, this invention provides an electrophoretic display comprising an electrophoretic medium having a plurality of charged particles suspended in a suspending fluid, and two electrodes disposed on opposed sides of the electrophoretic medium, at least one of the electrodes being light-transmissive and forming a viewing surface through which an observer can view the display. The display has a closed optical state in which the charged particles are spread over substantially the entire viewing surface so that light cannot pass through the electrophoretic medium, and an open optical state in which the electrophoretic particles form chains extending between the electrodes so that light can pass through the electrophoretic medium. Insulating layers are disposed between the electrodes and the electrophoretic medium.

The provision of the insulating layers in such an electrophoretic display enables one to use a much wider range of electrophoretic particles than can be employed in displays which lack such layers, for example the displays described in the aforementioned European Patent Application No. 709,713. Since the insulating layers prevent direct contact between the electrophoretic particles and the electrodes, conductive electrophoretic particles, for example carbon black, can be employed without any risk that chains of the electrophoretic particles will short the electrodes.

It will be appreciated that, since the operation of electrophoretic media depends upon the passage of small currents therethrough, the "insulating layers" used in the display of the present invention should not completely block the passage of current therethrough. However, the resistivities of electrophoretic media are typically so high (around $10^{10}$ ohm cm) that many materials normally considered to be insulators can be successfully used in the present invention. As discussed in more detail in U.S. Pat. No. 6,831,769, the insulating layers used in the present invention should typically have a volume resistivity of from about $10^9$ to $10^{11}$ ohm cm, the optimum value varying of course with the volume resistivity of the electrophoretic medium itself.

The provision of the insulating layers in accordance with the insulating layers aspect of the present invention need not involve additional steps in the manufacture of the displays. As discussed in the aforementioned 2004/0027327, and various other E Ink and MIT patents and applications mentioned above, one preferred method for constructing an electrophoretic display is to first form a so-called "front plane laminate" comprising, in order, a light-transmissive electrically-conductive layer; a layer of a solid electrophoretic medium in electrical contact with the electrically-conductive layer; and an adhesive layer; the adhesive layer may be covered during storage by a release sheet, which is removed before the front plane laminate is subjected to the lamination described below. Such a front plane laminate typically also comprises a front substrate which supports the electrically-conductive layer and forms the front surface of the final display, thus providing mechanical protection for the electrophoretic medium. To form the final display, the front plane laminate is laminated, typically under heat and pressure, to a backplane comprising at least one electrode. When a display is formed by such a process, in the final display the adhesive can serve as the insulating layer between the backplane electrode(s) and the electrophoretic medium. The use of a lamination adhesive as an insulating layer is, of course, not confined to a lamination adhesive provided as part of a front plane laminate; for example, an adhesive layer formed by spreading adhesive on a backplane may also serve as an insulating layer. Indeed, where an electrophoretic display is formed using a "double release film" as described in the aforementioned 2004/0155857 (such a double release film essentially comprising a layer of electrophoretic medium with adhesive layers provided on both sides thereof, the display being formed by separately laminating the double release film to a backplane and a front substrate), both insulating layers may be adhesive layers.

Similarly, if the electrophoretic medium is an encapsulated electrophoretic medium in which the suspending fluid and particles are held within a plurality of capsules, as described in the aforementioned E Ink and MIT patents and applications, the capsule walls (and optionally the binder which is typically used to surround the capsules and form them into a coherent layer) can serve as the insulating layers required by the present invention. Also, if the electrophoretic medium is of the microcell type, the end walls of the microcells may serve as the insulating layers required by the present invention.

In an insulating layers display of the present invention, both electrodes are normally continuous within each pixel of the display; there is in general no need for the type of striped electrodes used in European Patent Application No. 709,713, as discussed above, so the expense and manufacturing difficulties associated with such striped electrodes can be avoided. In practice, the generally preferred electrode configuration for the present display will be the conventional one with a continuous front electrode which extends over a plurality of pixels, and typically the whole display, and a matrix of pixel electrodes formed on a backplane, one pixel electrode being associated with each pixel of the display.

Opening and closing of the present display (i.e., movement of the display between its open and closed optical states) is preferably effected in the manner described in the aforementioned copending application Ser. No. 10/907,140 by varying the frequency of the field applied between the electrodes. As discussed in this copending application, a high frequency AC field (typically of the order of 200-1000 Hz) applied between the electrodes causing chaining (stranding) of the particles and opening of the display, while application of a DC or low frequency AC field (typically below 50 Hz) causes closing of the display. The ability to close the display using a DC field is important, since such a DC field rapidly brings the electrophoretic particles adjacent and covering the whole area of one electrode. Thus, the display can be actively and rapidly closed; such closing is much quicker than diffusion-controlled particle movement as in the first type of display described in European Patent Application No. 709,713, and is less susceptible to light leakage between adjacent strands, as in the second type of display described in this European application. Gray scale can be achieved by varying the frequency of the alternating field; see the aforementioned WO 03/107315 and copending application Ser. No. 10/907,140.

The bistability of the displays of the present invention can be improved in the manner described in the aforementioned 2002/0180687 by dissolving or dispersing in the suspending fluid a polymer having an intrinsic viscosity of $\eta$ in the suspending fluid and being substantially free from ionic or ionizable groups in the suspending fluid, the polymer being present in the suspending fluid in a concentration of from about $0.5\eta^{-1}$ to about $2.0\eta^{-1}$. This polymer may be, for example, polyisobutylene (PIB) or Kraton. Excellent image stability might be achieved by the depletion-flocculation mechanism, as described in this published application.

Although the suspending fluid used in the present display is typically a liquid, it may also be a gas, as described for example in the aforementioned 2004/0112750.

As already mentioned, the second aspect of the present invention relates to color displays using color filter arrays or color reflectors in conjunction with electrophoretic displays, having an open state in which the electrophoretic particles form chains. It is known that a color display can be produced by combining a shutter mode display with a color filter (positioned either "in front of" (that is to say between an observer and the shutter mode display) or "behind" (that is to say on the opposed side of the display from an observer) the display, or a color reflector positioned behind the display. When a pixel of the display is in its open state, the observer sees the color of the filter or reflector adjacent the pixel; to enhance the color seen, the display may be backlit or a reflector may be positioned behind the display. Typically, the color array has repeating triads or stripes of three primary colors, with each third of each triad or stripe associated with a different pixel so that a full color display is provided. Such color displays are illustrated in FIG. 32B of the aforementioned European Patent Application No. 709,713 and in U.S. Pat. No. 6,864,875.

Many such prior art color displays rely upon lateral movement of electrophoretic particles (i.e., movement of the electrophoretic particles parallel to the plane of the electrophoretic layer); see, for example, the aforementioned U.S. Pat. No. 6,864,875, especially FIGS. 2A-2D and 3A-3I, and 2004/0136048, in which the lateral movement of the electrophoretic particles is effected by dielectrophoresis. Typically in the open state of a pixel of such a display, the electrophoretic particles are concentrated in a small fraction of the area of a pixel, so that the majority of the pixel area allows light to pass therethrough and the color of the filter or reflector is seen, while in the closed state of the pixel the particles cover at least the major part of the area of the pixel, so that the pixel appears dark. Such lateral movement of electrophoretic particles is subject to various problems. Typically, each pixel requires two or more electrodes on the same side (normally the rear side, adjacent the backplane) of the display, which leads to a complicated, non-standard backplane. The electrodes may also be required to be of differing size and/or overlapping but insulated from one another; see, for example, European Patent Application No. 1,254,930. It may prove difficult to move the electrophoretic particles laterally quickly and in a manner which distributes them sufficiently uniformly in the closed state to avoid the disadvantageous effects on the closed, dark state of even a small fraction of the pixel area not being covered by the charged particles.

In accordance with the second aspect of the present invention, a color shutter mode display is provided using a color array in association with a electrophoretic display in which the or each pixel comprises an electrophoretic medium, comprising a plurality of electrically charged particles suspended in a suspending fluid, and electrodes (normally a pair of electrodes) on opposed sides of the electrophoretic medium, the pixel having a closed optical state in which the charged particles are spread over substantially the entire viewing surface of the pixel so that light cannot pass through the pixel, and an open optical state in which the electrophoretic particles form chains extending between the electrodes so that light can pass through the pixel. In a preferred form of such a display, in the closed state the charged particles are moved by a DC field to aggregate adjacent one electrode of the display.

This type of color display has the advantage of only requiring two electrodes for each pixel, one on each side of the electrophoretic medium. Thus, the display is compatible with a conventional continuous front electrode/backplane with pixel electrode matrix architecture. Furthermore, since the charged particles only need to move laterally a sufficient distance to form part of a chain, and typically there will be several chains per pixel, the opening of the color display of the present invention will typically be substantially more rapid than a display which requires the charged particles to move laterally a substantial fraction of the width of a pixel from one electrode to another. Furthermore, since the pixels of the display can be closed in a manner similar to a conventional electrophoretic display by applying a DC or low-frequency AC field and bringing all particles adjacent one electrode, closing can be effected rapidly and a good dark state produced, since the particles can cover the whole of one electrode without any need to leave a small electrode uncovered.

The color displays of the present invention may make use of any of the optional features of the first aspect of the present invention, as discussed above.

Embodiments of the present invention will now be described, though by way of illustration only, with reference to the accompanying drawings.

FIG. 1 is a schematic cross-section through an insulating layers display (generally designated 100) of the present invention, the display 100 being illustrated in its closed (opaque) optical state, in which light cannot pass through the display. The display 100 comprises transparent rear and front substrates 102 and 104 respectively, which form the external layers of the display 100. The thicknesses of the various layers shown in FIG. 1 (and in the other Figures described below) are not to scale and typically the substrates 102 and 104 will be substantially thicker than illustrated in FIG. 1 to provide a rigid, mechanically strong display. Indeed, when the display 100 is to act as a VT window, the substrates 102 and 104 can be in the form of two glass sheets forming the window.

The rear substrate 102 is provided with a plurality of discrete pixel electrodes 106, only one of which is shown in FIG. 1, while the front substrate 104 is provided with a single continuous electrode 108, which extends across the entire display. Between the electrodes 106 and 108 is disposed an electrophoretic medium comprising electrically charged particles 110 dispersed in a suspending fluid 112.

Insulating layers 114 and 116 respectively are provided between the electrodes 106 and 108 and the suspending fluid 112. The insulating layers 114 and 116 are both continuous over the whole display 100 and serve to prevent direct contact between the charged particles 110 and the electrodes 106 and 108, thereby permitting conductive particles to be used as the charged particles 110, and reducing the tendency for the charges on the charged particles 110 to be altered by contact with the electrodes 106 and 108.

As already mentioned, FIG. 1 shows the display 100 in its closed (opaque) optical state, in which the particles 110 are spread substantially uniformly over the electrode 108 so that the whole area of the pixel defined by the electrode 106, so rendering the display non-light transmissive. This closed state of the display 100 can be produced by applying a constant electrical field between the electrodes 106 and 108 so that all the charged particles 110 are drawn adjacent the front electrode 108; alternatively, of course, by varying the direction of the electric field, the particles 110 could be drawn adjacent the rear electrode 106.

Figure 2:
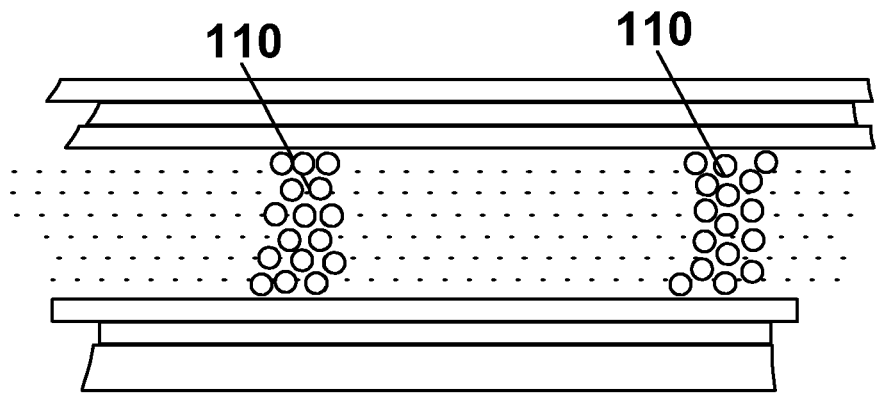
FIG. 2 is a schematic cross-section through the same display as in FIG. 1 but showing the display in its open optical state.

FIG. 2 shows the display 100 in its open (transparent optical state), in which the charged particles 110 are arranged in "chains" extending between the electrodes 106 and 108 (or, more strictly between the insulating layers 114 and 116) so that the particles occupy only a small fraction of the pixel, and light can pass through the pixel. As already mentioned, such chaining of the particles can be effected by applying a high frequency alternating electric field between the electrodes 106 and 108.

FIG. 3 is a schematic cross-section through a color filter array display (generally designated 300) of the present invention; the display 300 also is provided with insulating layers similar to those of FIG. 1. The display 300 comprises a rear substrate 302, a front substrate 304, pixel electrodes 306R, 306G and 306B, a continuous front electrode, charged particles 310, a suspending fluid 312 and insulating layers 314 and 316, all of which are generally similar to the corresponding components of the display 100 shown in FIG. 1. However, in the display 300, the front substrate 304 is formed as a color filter array with colored, light-transmissive red, green and blue sections 304R, 304G and 304B respectively, these red, green and blue sections being aligned with the pixel electrodes 306R, 306G and 306B respectively.

The display 300 is designed to be backlit from below and viewed from above (as illustrated in FIG. 3); alternatively, a reflector may be provided below the display (i.e., adjacent the rear substrate) so that light passing through the display from above is reflected back through the display and viewed from above. As illustrated in FIG. 3, the pixel electrodes 306R, 306G and 306B in effect define sub-pixels which can be placed in their open or closed optical states independently of one another; for example, FIG. 3 shows the red and blue sub-pixels defined by electrodes 306R and 306B in their open states, but the green sub-pixel defined by electrode 306G in its closed state, so that an observer viewing the pixel sees a magenta color.

FIG. 4 is a schematic cross-section through a color reflector display (generally designated 400) of the present invention; the display 400 is again provided with insulating layers similar to those of FIG. 1. The display 400 closely resembles the display 300 shown in FIG. 3 but lacks the color filter array provided in the front substrate 304 of display 300; instead the display 400 is provided with an array of colored reflectors comprising red, green and blue reflectors 402R, 402G and 402B respectively formed within the rear substrate 402 and aligned with the pixel electrodes 306R, 306G and 306B respectively.

As will readily be apparent to those skilled in the display art, the display 400 operates in a manner closely similar to that of the display 300. The pixel electrodes 306R, 306G and 306B in effect define sub-pixels which can be placed in their open or closed optical states independently of one another; for example, in FIG. 4, the red and blue sub-pixels defined by electrodes 306R and 306B in their open states, but the green sub-pixel defined by electrode 306G in its closed state. Hence an observer viewing the display from above (as illustrated in FIG. 4) will see red light reflected from the red reflector 402R and blue light reflected from the blue reflector 402B, but will not see any light reflected from the green reflector 402G. Hence, the pixel defined by the three pixel electrodes shown in FIG. 4 will display a magenta color.

It will be apparent to those skilled in the art that numerous changes and modifications can be made in the specific embodiments of the present invention described above without departing from the scope of the invention. For example, although the electrophoretic displays illustrated in FIGS. 1 to 4 use unencapsulated electrophoretic media, the displays of the present invention may also use encapsulated, polymer-dispersed or microcell electrophoretic media. The color filter array display 300 shown in FIG. 3 may be modified by placing the color filter array "behind" the electrophoretic medium (from the perspective of an observer), for example within the rear substrate 302, in a manner similar to that used in the display 400 shown in FIG. 4. Other changes and modifications will readily be apparent to those skilled in the display art. Accordingly, the whole of the foregoing description is to be construed in an illustrative and not in a limitative sense.

The invention claimed is:

1. An electrophoretic display comprising:
   an electrophoretic medium having a plurality of charged particles suspended in a suspending fluid, and
   two electrodes disposed on opposed sides of the electrophoretic medium, at least one of the electrodes being light-transmissive and forming a viewing surface through which an observer can view the display,
   the display having a closed optical state in which the charged particles are spread over substantially the entire viewing surface so that light cannot pass through the electrophoretic medium, and an open optical state in which the electrophoretic particles form chains extending between the electrodes so that light can pass through the electrophoretic medium,
   the display further comprising insulating layers disposed between the electrodes and the electrophoretic medium.

2. An electrophoretic display according to claim 1 wherein at least some of the charged particles are electrically conductive.

3. An electrophoretic display according to claim 2 wherein the electrically conductive particles comprise carbon black.

4. An electrophoretic display according to claim 1 in which the charged particles and the suspending fluid are confined within a plurality of capsules.

5. An electrophoretic display having a plurality of pixels and comprising:
   an electrophoretic medium having a plurality of charged particles in a fluid, and
   electrodes disposed on opposed sides of the electrophoretic medium, at least one of the electrodes being light-transmissive and forming a viewing surface through which an observer can view the display,
   each pixel of the display having a closed optical state in which the charged particles are spread over substantially the entire viewing surface of the pixel so that light cannot pass through the electrophoretic medium, and an open optical state in which the electrophoretic particles form chains extending between the electrodes of the pixel so that light can pass through the pixel,
   the display further comprising a color array adjacent the display so as to be visible to the observer, such that the color of the display perceived by the observer can be varied by changing the open and closed optical states of the various pixels of the display.

6. An electrophoretic display according to claim 5 wherein the color array is a color filter array comprising an array of colored but light-transmissive elements.

7. An electrophoretic display according to claim 6 wherein the color filter array is disposed adjacent the viewing surface of the display.

8. An electrophoretic display according to claim 6 wherein the color filter array is disposed on the opposed side of the display from the viewing surface.

9. An electrophoretic display according to claim 6 further comprising a light source disposed on the opposed side of the display from the viewing surface.

10. An electrophoretic display according to claim 6 further comprising a reflector disposed on the opposed side of the display from the viewing surface.

11. An electrophoretic display according to claim 5 wherein the color array is a color reflector array comprising an array of colored reflective elements.

12. An electrophoretic display having a plurality of pixels and comprising:
- an electrophoretic medium having a plurality of charged particles in a fluid, and
- electrodes disposed on opposed sides of the electrophoretic medium, at least one of the electrodes being light-transmissive and forming a viewing surface through which an observer can view the display,
- each pixel of the display having a closed optical state in which the charged particles are spread over substantially the entire viewing surface of the pixel so that light cannot pass through the electrophoretic medium, and an open optical state in which the electrophoretic particles form chains extending between the electrodes of the pixel so that light can pass through the pixel,
- the display further comprising a color array adjacent the display so as to be visible to the observer, such that the color of the display perceived by the observer can be varied by changing the open and closed optical states of the various pixels of the display, and insulating layers disposed between the electrodes and the electrophoretic medium.

13. An electrophoretic display according to claim 12 wherein at least one of the insulating layers has a volume resistivity of about $10^9$ to about $10^{11}$ ohm cm.

14. An electrophoretic display according to claim 12 wherein at least some of the charged particles are electrically conductive.

15. An electrophoretic display according to claim 14 wherein the electrically conductive particles comprise carbon black.

16. An electrophoretic display according to claim 5 in which the charged particles and the fluid are confined within a plurality of capsules.

17. An electrophoretic display according to claim 16 wherein the capsules are held within a polymeric binder.

18. An electrophoretic display according to claim 5 in which the charged particles and the fluid are present as a plurality of discrete droplets held within a continuous phase comprising a polymeric binder.

19. An electrophoretic display according to claim 18 in which the continuous phase forms walls separating a plurality of cells in which the charged particles and the fluid are confined.

20. An electrophoretic display having a plurality of pixels and comprising:
- an electrophoretic medium having a plurality of charged particles in a fluid, and
- electrodes disposed on opposed sides of the electrophoretic medium, at least one of the electrodes being light-transmissive and forming a viewing surface through which an observer can view the display,
- each pixel of the display having a closed optical state in which the charged particles are spread over substantially the entire viewing surface of the pixel so that light cannot pass through the electrophoretic medium, and an open optical state in which the electrophoretic particles form chains extending between the electrodes of the pixel so that light can pass through the pixel,
- the display further comprising a color array adjacent the display so as to be visible to the observer, such that the color of the display perceived by the observer can be varied by changing the open and closed optical states of the various pixels of the display, and voltage supply means for applying voltages to the two electrodes, the voltage supply means being arranged to supply both a high frequency alternating current voltage effective to drive the display to its open optical state and a low frequency alternating or direct current voltage effective to drive the display to its closed optical state.

21. An electrophoretic display according to claim 20 wherein the high frequency alternating current voltage has a frequency in the range of about 200 to about 1000 Hz, and the low frequency alternating or direct current voltage has a frequency in the range of 0 to about 50 Hz.

22. An electrophoretic display according to claim 20 wherein the voltage supply means is further arranged to supply at least one intermediate frequency alternating current voltage having a frequency intermediate those of the high frequency alternating current voltage and the low frequency alternating or direct current voltage, the intermediate frequency alternating current voltage being effective to drive the display to a gray state intermediate the open and closed optical states of the display.

23. An electrophoretic display according to claim 5 wherein the fluid has dissolved or dispersed therein a polymer having an intrinsic viscosity of $\eta$ in the suspending fluid and being substantially free from ionic or ionizable groups in the fluid, the polymer being present in the fluid in a concentration of from about $0.5\eta^{-1}$ to about $2.0\eta^{-1}$.

24. An electrophoretic display according to claim 23 wherein the polymer is a polyisobutylene.

* * * * *